United States Patent
Parenteau et al.

(10) Patent No.: US 7,889,205 B1
(45) Date of Patent: Feb. 15, 2011

(54) FRAME BUFFER BASED TRANSPARENCY GROUP COMPUTATION ON A GPU WITHOUT CONTEXT SWITCHING

(75) Inventors: Alexandre S. Parenteau, San Jose, CA (US); Cynthia W. Lau, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1084 days.

(21) Appl. No.: 11/586,117

(22) Filed: Oct. 24, 2006

(51) Int. Cl.
*G09G 5/36* (2006.01)

(52) U.S. Cl. .................. 345/545; 345/582; 345/629; 345/641; 345/592; 345/552; 382/282; 382/284

(58) Field of Classification Search .................. None
See application file for complete search history.

(56) References Cited

U.S. PATENT DOCUMENTS

| | | | |
|---|---|---|---|
| 5,559,950 A | 9/1996 | Cannon | |
| 5,870,098 A | 2/1999 | Gardiner | |
| 6,466,210 B1* | 10/2002 | Carlsen et al. | 345/629 |
| 6,496,187 B1 | 12/2002 | Deering et al. | |
| 6,646,640 B2 | 11/2003 | Nagy | |
| 7,075,545 B2* | 7/2006 | Van Hook et al. | 345/546 |
| 2006/0001663 A1* | 1/2006 | Ruttenberg et al. | 345/419 |
| 2006/0055970 A1 | 3/2006 | Smith | |
| 2006/0103647 A1 | 5/2006 | Andrews | |
| 2006/0109279 A1 | 5/2006 | Mueller et al. | |
| 2007/0091108 A1* | 4/2007 | Spicer | 345/582 |
| 2008/0036763 A1* | 2/2008 | Chen et al. | 345/422 |

OTHER PUBLICATIONS

"Visibility and Games: Interactive Visibility Ordering and Transparency Computations Among Geometric Primitives in Complex Environments"; Govindaraju, Henson, Lin and Manocha; Proceedings of the 2005 Symposium on Interactive 3d Graphics and Games 13D '05; 8 pages.

* cited by examiner

*Primary Examiner*—Ulka Chauhan
*Assistant Examiner*—Donna J Ricks
(74) *Attorney, Agent, or Firm*—Robert C. Kowert; Meyertons, Hood, Kivlin, Kowert & Goetzel, P.C.

(57) ABSTRACT

Transparency groups or other images may be rendered on graphics hardware using a GPU utilizing only a single frame buffer and without the need to switch contexts to another frame buffer. A single frame buffer may be allocated and the overall background image may be rendered to the frame buffer. In order to render a foreground image to be combined with the background image, a sub-image of the background image is copied from the frame buffer to a texture atlas. The foreground image may then be rendered to the portion of the frame buffer from which sub-image was copied. The foreground image may then be copied from the frame buffer into the texture atlas. Additionally, both the sub-image of the background image and the foreground image may be merged and copied from the texture atlas into the frame buffer.

21 Claims, 9 Drawing Sheets

FRAME BUFFER BASED TRANSPARENCY GROUP COMPUTATION ON A GPU WITHOUT CONTEXT SWITCHING

BACKGROUND

1. Field of the Invention

The present invention is directed to computer systems. More particularly, it is directed to graphical image processing.

2. Description of the Related Art

Traditionally, rendering a complex image, such as one requiring the rendering of multiple sub-images, on a graphic processing unit (GPU) required switching between multiple frame buffers. Additionally, texture maps have generally been used to store textures that are two-dimensional representations of three-dimensional models to be applied to various surfaces when rendering a three-dimensional scene. For example, a texture atlas may include all of the individual graphic elements rendered in a flat two-dimensional fashion that would then be applied to a three-dimensional geometry.

When utilizing graphics hardware, such as a GPU, graphics or pixels, sometimes called fragments, can generally only be rendered to individual frame buffers. Additionally, combining particular foreground graphics with the background, such as when rendering a partially transparent graphic object, traditionally involves rendering the background image to one frame buffer, allocating a second frame buffer, performing a context switch to the second frame buffer, rendering the foreground image to the second frame buffer, performing another context switch back to the original frame buffer, and then copying (and possibly blending or combining) the foreground image onto the background image in the original frame buffer to result in the correct overall image.

Furthermore, performing a context switch on a GPU is typically a very expensive operation, such as in terms of execution time. Given that many graphic-intensive applications may include many (even thousands of) individual graphic objects requiring rendering, performing multiple context switches to render a single overall may cause significant performance issues, such as increasing the overall execution time.

Texture mapping may be considered a method of adding detail, surface texture, or color, to a computer-generated graphic or 3D model. Frequently, a texture is applied (i.e. mapped) to the surface of a shape. A texture map or texture atlas is a particular type of memory allocation used within graphics hardware. The texture atlas includes multiple textures that may be individually accessed from within the texture atlas and mapped onto the surface of graphics objects being rendered. Generally, the texture information stored in a texture atlas is static within the texture atlas. In other words, the texture information is loaded once, such as at program initialization, and is only read subsequently. For example, a graphic intensive video game may load a set of two-dimensional graphic representations of various graphic elements into texture atlas from which they will be read from throughout the game. Frequently, the entire set of textures may be loaded as a single block directly into a texture map. For example, two-dimension representations of individual features in a game, such as game pieces, people, outfits, objects, etc. may be loaded into a texture atlas at the start of the game and used throughout the game to render those elements.

SUMMARY

Transparency groups or other images may be generated or rendered on graphics hardware using only a single frame buffer and without the need to switch contexts to another frame buffer, which can be extremely slow and expensive (in terms of execution time). In some embodiments, special use of a texture map or texture atlas may allow complex image rendering, including the transparency-based blending of multiple smaller images, using a single frame buffer and without performing a context switch. For example, a single frame buffer may be allocated and the overall background image may be rendered to the frame buffer. In order to render a foreground image to be combined with the background image, in some embodiments, a working section of the background image is copied from the frame buffer to a texture atlas. The working section of the frame buffer may then be cleared and the foreground image may then be rendered to that working section of the frame buffer (rather than to a separate frame buffer). The foreground image may then be copied from the frame buffer into the texture atlas at a location different from the location to which the working section of the background image was copied. The working section of the frame buffer may again be cleared. Finally, both the section of the background image and the copy of the foreground image may be copied from the texture atlas and combined (using a suitable blending algorithm) into the working section of the frame buffer.

Additionally, the rendering of the foreground image to the frame buffer might itself require the blending or combining of various smaller images and various of the smaller images may need to be combined or blended using different blending modes, functions or algorithms. In such a case, a smaller section of the working section of the frame buffer, into which one layer of the foreground image has been rendered may be copied into the texture atlas and a different layer of the foreground image may be rendered to the smaller working section of the frame buffer. The foreground layer may then be copied into the texture atlas and both the foreground layers may then be combined and copied into the smaller section of the working frame buffer. Thus, a complex image, such as one including multiple image layers that must be combined and/or blended in various manners may be rendered on graphics hardware using a single frame buffer and a texture atlas, without performing potential expensive context switches.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
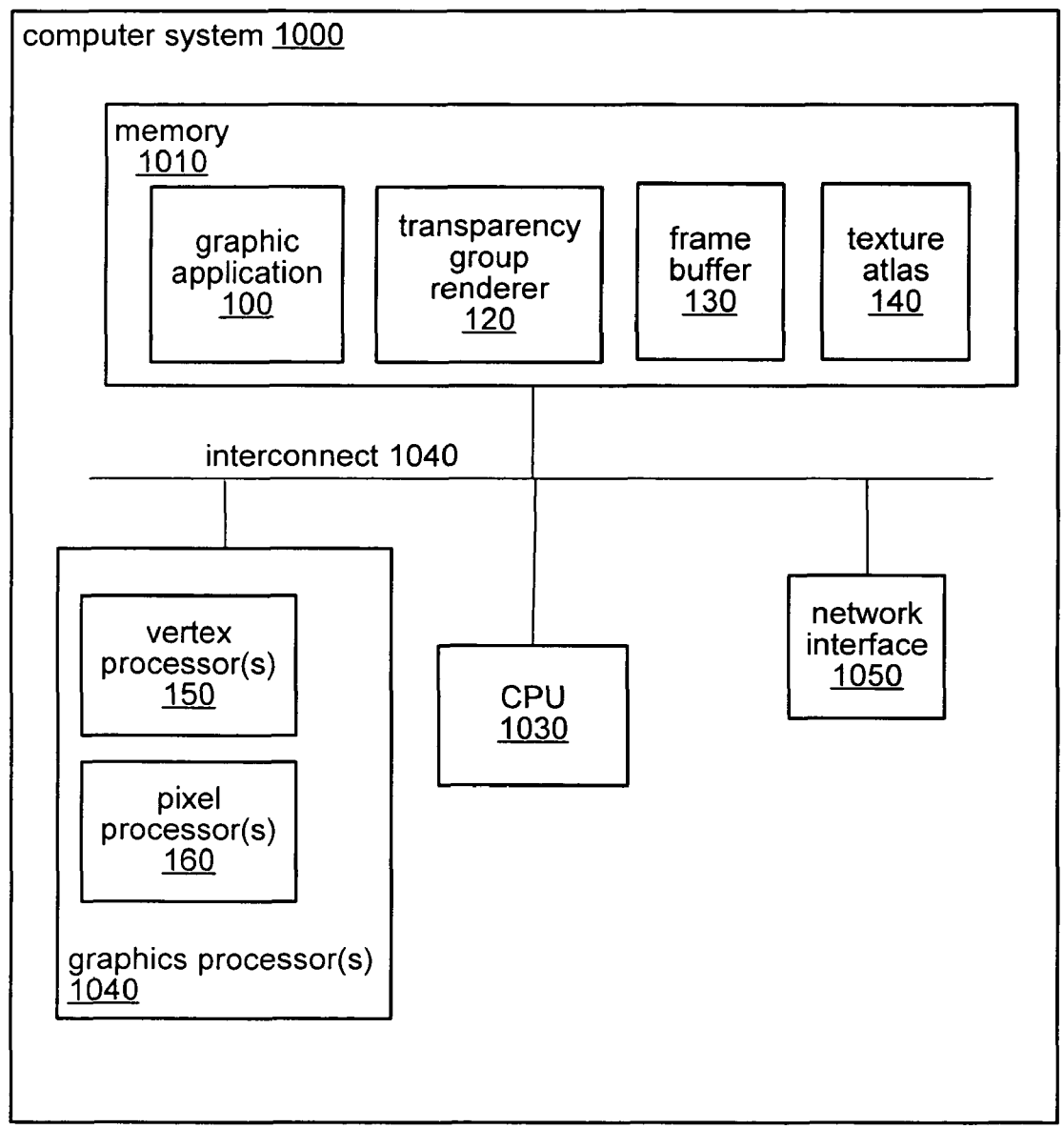
FIG. 1 is a block diagram illustrating one embodiment of a computer system capable of implementing a transparency group renderer, as described herein.

Groups of graphic objects, such as transparency groups, or other images may be generated or rendered on graphics hardware, such as on a GPU, using only a single frame buffer and without the need to switch contexts to another frame buffer, which can be extremely slow and expensive (in terms of execution time). As will be described herein, special use of a texture atlas may allow complex image rendering, including the transparency-based blending of multiple smaller images, using a single frame buffer and without performing a context switch. FIG. 1 is a block diagram illustrating one embodiment of a computer system 1000 suitable for implementing the rendering of transparency groups on a GPU 1040 using a single frame buffer 130.

A graphics processing unit or GPU is a dedicated graphics rendering device for a personal computer, workstation or game console. Modern GPUs may be very efficient at manipulating and displaying computer graphics and their highly parallel structure may make them more effective than typical CPUs for a range of complex graphical algorithms. For example, a GPU may implement a number of graphics primitive operations in a way that makes executing them must faster than drawing directly to the screen with the host CPU. Many GPUs have programmable shading as part of their capabilities. For example, each pixel can be processed by a short program that could include additional image textures as inputs, and each geometric vertex could likewise be processed by a short program before it was projected onto the screen. These pixel and vertex programs may be called 'shaders' and may implement looping and lengthy floating-point math, and in general are quickly becoming as flexible as CPUs and orders of magnitude faster for image-array operations. GPUs may include support for programmable shaders that can manipulate and vertices and textures with many of the same operations supported by CPUs, oversampling and interpolation techniques to reduce aliasing, and very high-precision color spaces.

Frequently there are multiple overlapping image elements to be rendered and combined with the background for a final image. These groups of overlapping image elements may be called transparence groups. A transparency group may be considered a set of images, each of which may have associated levels of opacity or transparency directing how the individual images relate to each other when rendered In some embodiments, various individual elements of a transparency group may be combined using different compositing effects, such as to result in different levels of transparency or opacity. Additionally, the overall rendering of the transparency group may then be combined with background image, such as by using another level of transparency to result in the final, overall image.

When a complex graphic image is rendered, frequently various compositing effects, such as differing levels of transparency are used to combine various elements of the image. Generally, such compositing effects cannot be applied until after the individual elements or constituent images are rendered properly. For example, when generating a complex image that includes a partially transparent sphere in front of a particular background, both the background and the sphere are rendered individually and then combined to result in a final image that includes the background showing through, and distorted by, the transparent sphere.

In some embodiments, a transparency group renderer 120 may be configured to render a graphics image, often comprising multiple transparency groups, on GPU 1040, using a single frame buffer 130. As noted above, transparency group renderer 120 may be configured to utilize one or more texture atlases, such as texture atlas 140, to enable the rendering of transparency groups without the need to perform context switching between multiple frame buffers.

By using texture atlas 140, complex rendering may be performed in graphics hardware without using multiple frame buffers. For example, rather than render the background in one frame buffer and the sphere in separate frame buffer, transparency group renderer may utilize texture atlas 140 to temporarily store individual portions or layers of a complex image during the rendering of that image. Generally images cannot be rendered directly to a texture atlas. Instead, images or image portions are copied between a frame buffer and the texture atlas. For instance, using the example above, a single frame buffer and a single texture atlas may be allocated in graphics hardware. The background image may first be rendered or rasterized to the frame buffer. Then the section (i.e. the working section) of the background image over which the transparent sphere is to be drawn may be copied into the texture atlas. The working section of the frame buffer may then be cleared to be ready to render additional image elements. Please note that whether or not the working section of the frame buffer needs to be cleared may depend upon how the additional image elements are rendered. For example, if the additional image elements are to be rendered such that any new pixels drawn completely replace the existing pixels, then the working section of the frame buffer may not need to be cleared. However, if the additional image elements are to be rendered in such a way that new pixels are combined with or blended with existing pixels, the working section of the frame buffer may be cleared. The sphere may then be rendered into the working section of the frame buffer without including any portion of the background image into the image of the sphere. The rendered sphere may then be copied into the texture atlas, such as by copying the same working section of the frame buffer, which now includes the image of the sphere rather than a portion of the background image. The working section of the frame buffer may be cleared again and then the portion of the background image and the image of the sphere from the texture atlas may be combined, such as using a suitable compositing effect or blending mode, and copied to the working section of the frame buffer. As noted above, in some embodiments, depending upon how the portion of the background image and the image of the sphere are copied to the frame buffer, the working section of the frame buffer may not be cleared before.

Thus, the texture atlas may be used to dynamically and/or temporarily store individual rendered image elements, such as the background and sphere in the example above, which may then be combined or composited into the frame buffer resulting in a final image.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers are most commonly interfaced through a non-standard and often proprietary slot due to size and weight constraints. Such ports may still be considered AGP or PCI express, even if they are not physically interchangeable with their counterparts. As illustrated in FIG. 1, memory 1010 may represent any of various types and arrangements of memory, including general purpose system RAM and/or dedication graphics or video memory.

Integrated graphics solutions, or shared graphics solutions are graphics processors that utilize a portion of a computer's system RAM rather than dedicated graphics memory. For instance, modem desktop motherboards normally include an integrated graphics solution and have expansion slots available to add a dedicated graphics card later. As a GPU is extremely memory intensive, an integrated solution finds itself competing for the already slow system RAM with the CPU as it has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM.

Figure 2:
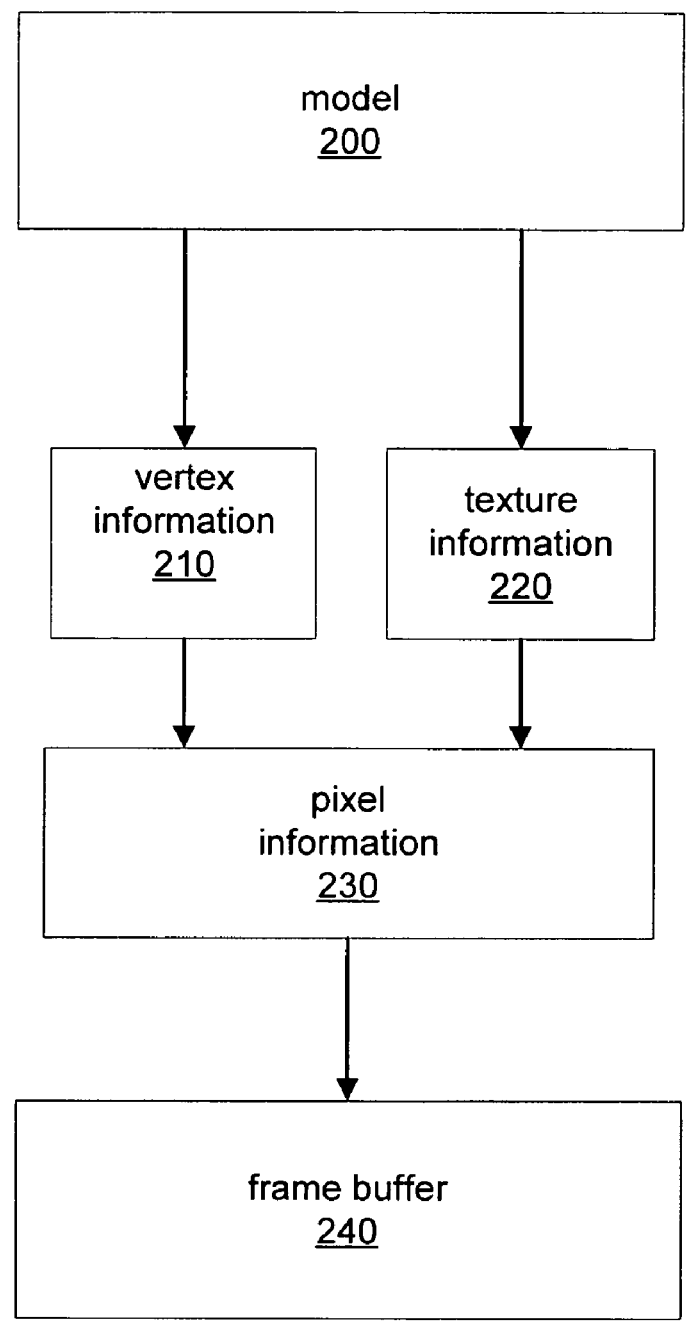
FIG. 2 is a block diagram illustrating the logical flow of rendering an image via a GPU, according to one embodiment.

A GPU may include programmable vertex and pixel and texture units. For example, FIG. 2 is a block diagram illustrating the logic flow of rendering an image via a GPU. As shown in FIG. 2, the model 200 of the graphics objects to be rendered is supplied from a graphics application executing on the CPU of a system and passes data to the vertex unit 210 and the texture unit 220. For example, graphics application 100, may call various functions of a graphics API, such as OpenGL or DirectX, that in turn instruct the various elements of the GPU to render the images. Vertex unit 210 may describe the geometry of an object while texture unit 220 may specify the skin covering on an object and pixel unit 230 may deal with the view of an object. As noted above, vertex unit 210 and pixel unit 230 may be configured to execute specific vertex and pixel programs, called shaders. For instance, vertex unit 210 may accept vertex information such as position from the model through a vertex buffer. As the same time, texture unit 220 may receive surface information from the model. Both units may complete processing and generate output pixel unit 230. Pixel unit 230 may then complete the lighting and view processing and output the rendered image to frame buffer 240 for display. A frame buffer may be a video output device that drives a video display from a memory buffer containing a complete frame of data. The information in the buffer typically consists of color values for every pixel (point that can be displayed) on the screen.

Figure 3:
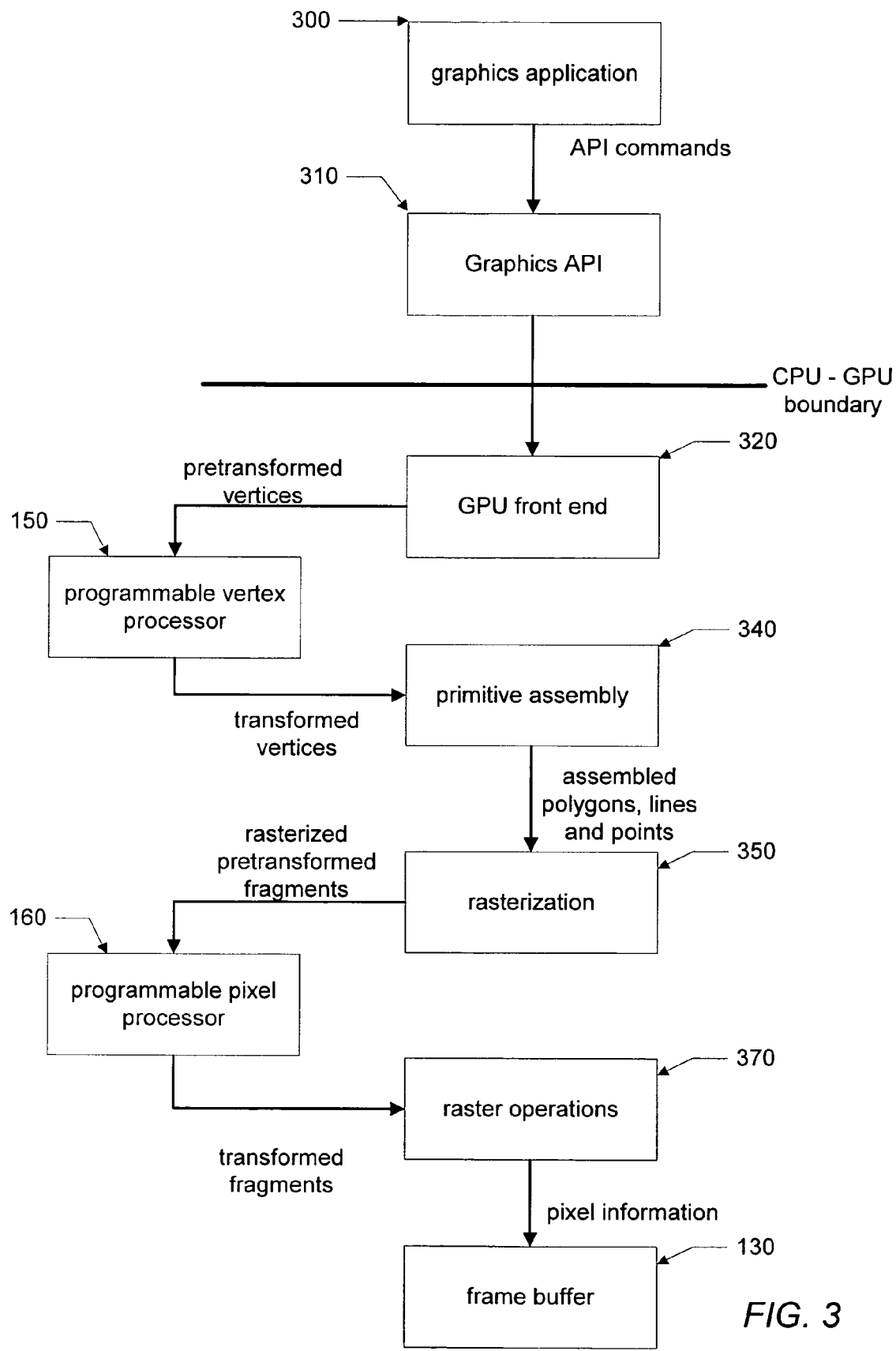
FIG. 3 is a block diagram illustrating the logical flow of functionality in a GPU pipeline, according to one embodiment.

Three-D graphics rendering involves numerous steps that are performed one after another. These steps can be thought of like an assembly line or pipeline. FIG. 3 is a block diagram illustrating one embodiment of the logical view of such a pipeline. A pipeline is a term used to describe the graphics card's architecture and it provides a generally accurate idea of the computing power of a graphics processor. There may be different pipelines within a graphics processor as there may be separate functions being performed at any given time. The pipeline may be broken down into two main stages: the geometry processing stage and the rendering stage. Geometry processing may involve calculations that modify or, in some cases, create new data for vertices. In the rendering stage of the pipeline, a pixel shader may be used to replace previously fixed function texturing, filtering and blending. A programmable shader, such as a pixel or vertex shader, may be considered a piece of code configured to perform different kinds of operations on GPU, including T&L, texturing, etc.

An important advantage of the modern GPU is the ability to be programmed through languages like OpenGL, DirectX or C for Graphics (CG). DirectX and OpenGL are graphics APIs or Application Programming Interfaces. Before 3D graphics APIs, each graphics card company had its own proprietary method of making their graphics card work. Developers were forced to program with vendor-specific paths for each and every type of graphics card they wished to support. This was naturally a very costly and inefficient approach. To solve this problem, 3D graphics APIs were created, so that developers could program their software to be compliant with the API and not with each independent piece of hardware. The responsibility of compatibility was then shifted to the graphics card manufacturers who had to ensure that their drivers where compatible with the API.

There emerged two different APIs, DirectX and OpenGL, both of which are used today. Initially, the APIs were relatively simple. Developers had to mix-and-match visual effects from an unchanging list of pre-programmed effects. Custom shader programming allows developers to create truly custom visual effects for the first time. Thus, graphics application 300 may call various functions supplied by graphics API 310, such as DirectX or OpenGL, in order to utilize the GPU to render a graphic image.

As noted above, vertex processor 150 and pixel processor 160 may be user programmable. A program executed by vertex processor 150 and/or pixel processor 160 may be called a 'shader'. Vertex shaders may deform or transform 3D elements.

A pixel processor, such as pixel processor 160, may be a component on the graphics chip devoted exclusively to pixel shader programs. These processing units may only perform calculations regarding pixels. Because pixels represent color values, pixel shaders may be used for all sorts of graphical effects. Pixel shaders may change pixel colors based on various types of input. For example, when the object is lit by a light source in a 3D scene in which some colors appear brighter while other colors create shadows, both the brighten objects and the shadows may be generated by changing various pixels' color information in a pixel shader. As noted above, a GPU may also include vertex processors, such as vertex processor 150, configured to execute vertex shaders that affect vertices.

A vertex shader may receive streams of vertex data from the graphics pipeline perform operations on the data and output the transformed vertex data to the graphics pipeline for further processing. For example, vertex processor 150 may receive pretransformed vertex data from GPU front end 320 and output transformed vertices to primitive assembly unit 340. Subsequently, the assembled polygons, lines and points may be sent to a rasterization unit 350. Pixel processor 160 may receive rasterized pretransformed pixel information, also called fragments, execute the applicable pixel shaders and output transformed fragments (pixel information) to a raster operations unit 370 that may then output the final pixel information to frame buffer Raster operation processors (ROPs), such as raster operations unit 370, may be responsible for writing pixel data to memory.

A GPU may also include texture mapping units (TMUs). Textures need to be addressed and filtered. This job is frequently performed by TMUs that work in conjunction with pixel and vertex shader units. The TMU's job is to apply texture operations to pixels.

Data communicated between the graphics processing unit and the rest of the computer may travel through the graphics card slot or other interface, such as interconnect 1040 of FIG. 1.

A technique called texture mapping may be used to map a digital image onto a surface of a graphic object. The image data mapped onto the object may be called a texture, and its individual elements may be called texels. The rectangular texture resides in its own texture coordinate space, or the texture may be defined by a procedure. At each rendered pixel, selected texels may be used to substitute for or to scale one or more surface properties, such as diffuse color components. One pixel may often mapped by a number of texels. For example, when a texture is mapped to a polygon, it is common to assign texture map coordinates directly onto the polygon's vertices. A number of different textures may be stored in a texture atlas, such as texture atlas 140, described above.

In the same manner that color can be assigned to a pixel, transparency or opacity can be assigned to it as well. Opacity and transparency are complements of each other in the sense that high opacity implies low transparency. The opacity may be considered a normalized quantity in the range [0,1], or alternatively in a discrete form in the range [0, 255] for use with 8 bit hardware. Opacity a may be related to transparency t by the expression: $a=1-t$. If an object has high opacity ($a=1$), the objects and light behind it are shielded and not visible. If at the same time the object has a non-zero color value, it is "emitting" light so it is visible. On the other hand, if $a<1$, the object is transparent and objects behind it are visible through it. If $a=0$, the object is invisible whatever the colors are.

As described above, a transparency group may be considered a set of images, each of which may have associated levels of opacity or transparency directing how the individual images relate to each other when rendered. In other words, when rendering the individual images of the transparency group, each image may be combined, blended or mixed with the other images based upon each image's respective level of transparency. Additionally, the transparency group as a whole may also have an associated level of transparency indicating how the group as a whole should interact with other artwork. For example, a graphics application may be drawing a scene in which a house appears on landscape. The landscape may be the background and the graphics application may render it first, such as to a frame buffer. The application may then render, either to a separate frame buffer or after saving a copy of the background, the objects in the transparency group using each image's associated transparency level. After all the objects of the transparency group are rendered, the resultant image may then be added to, copied onto, blended with, or otherwise combined with, the background image, using the transparency group's transparency level.

Figure 4A:
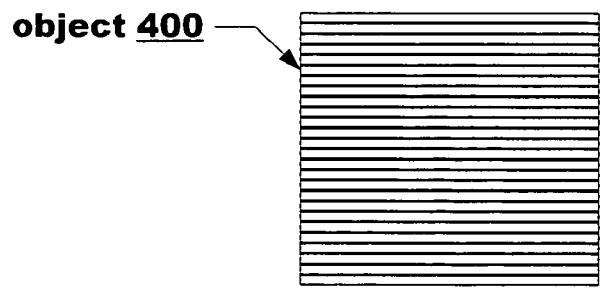
FIGS. 4A through 4C are block diagrams illustrating the rendering of a transparency group, in one embodiment.
Figure 4B:
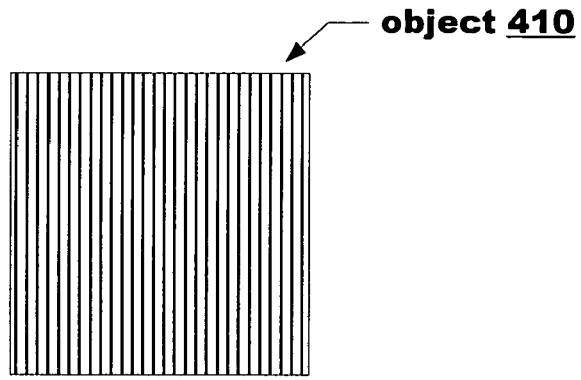
Figure 4C:
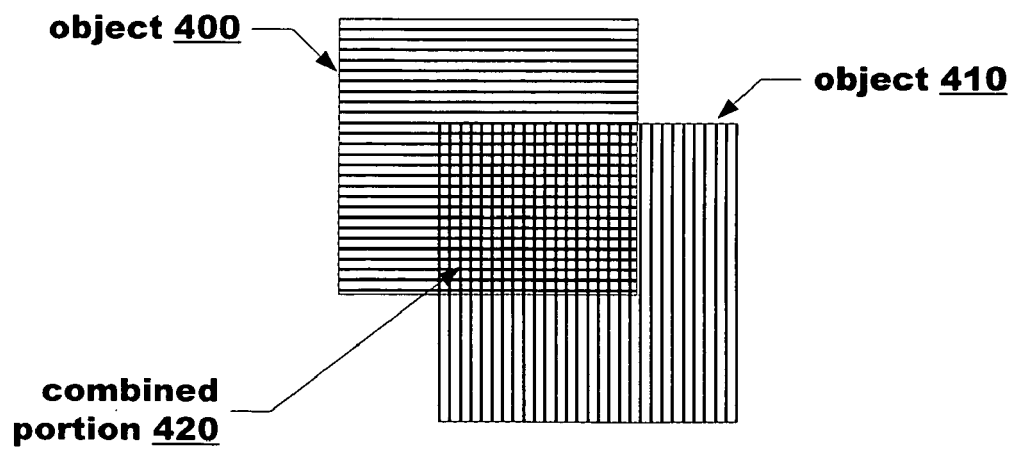

FIGS. 4A through 4C are block diagrams illustrating the rendering of a transparency group, according to one embodiment. As described above, a transparency group may include multiple graphic objects each of which may have an associated level of transparency and the group as a whole may also have an associated level of transparency. When rendering a transparency group, each of the objects may have to be combined with the other objects of the group according to the object's respective transparency level. As with other rendering, the objects of a transparency group may be rendered in back to front order. In other words objects that are farther away from the viewer may be rendered before objects that are closer to the viewer. FIG. 4A represents one object 400 of a transparency group and FIG. 4B represents another object 410 of the same transparency group. As is apparent from FIGS. 4A and 4B, each of the objects 400 and 410 have a different pattern. When rendering the entire transparency group, the individual objects 400 and 410 may be combined in various manners depending upon the individual transparency levels of the objects. For example, if object 410 has an associated transparency of 50% and if the two objects overlapped with object 410 on top, part of image 400 would be visible through object 410. Thus, as illustrated in FIG. 4C, the horizontal pattern of object 400 is visible through the vertical pattern of object 410 at combined portion 420.

FIGS. 5A through 5F are block diagrams illustrating the rendering of a transparency group using a single frame buffer, according to one embodiment. As described above, transparency groups may include multiple graphic objects to be rendered resulting in an image that may be copied onto or merged with other images, such as from other transparency groups. Additionally, transparency groups may be nested such that one or more of the graphic objects of a transparency group may themselves be transparency groups consisting of multiple graphic objects. Normally, graphic scenes are rendered from back to front. In other words, the background is drawn first and then objects in the foreground are drawn, copied, or merged onto the background. Objects closer to the viewer may be drawn or rendered after objects that are further from the viewer. Transparency groups may also include partially transparent objects through which portions of other objects, such as object behind the transparent objects, should be visible. Additionally, an entire transparency group may be partially transparent so that portions of the background, or of other objects behind the transparency group, should be visible through the transparency group image.

Figure 5A:
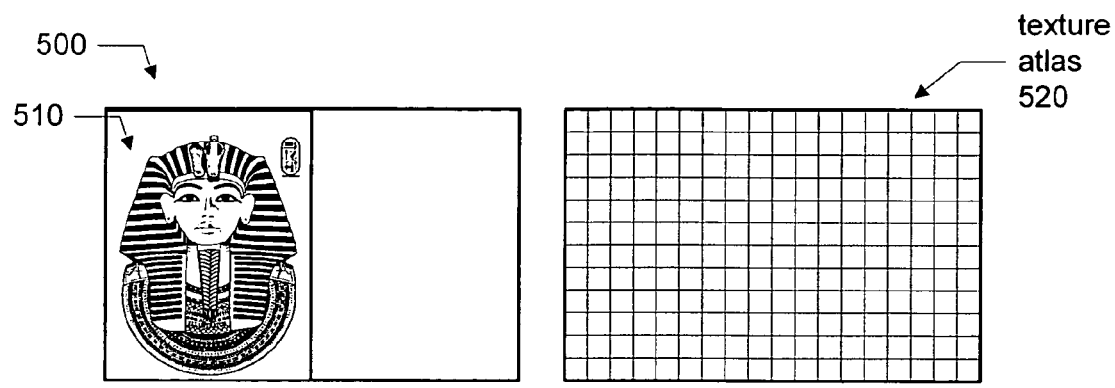
FIGS. 5A through 5F are block diagrams illustrating, according to one embodiment, the rendering of a transparency group on a GPU using a single frame buffer as described herein.
Figure 5B:
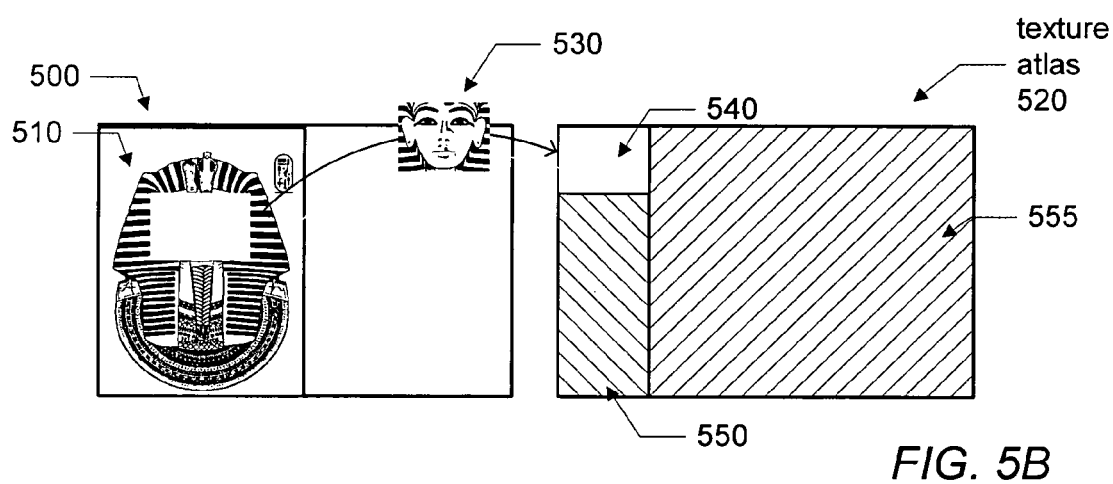
Figure 5C:
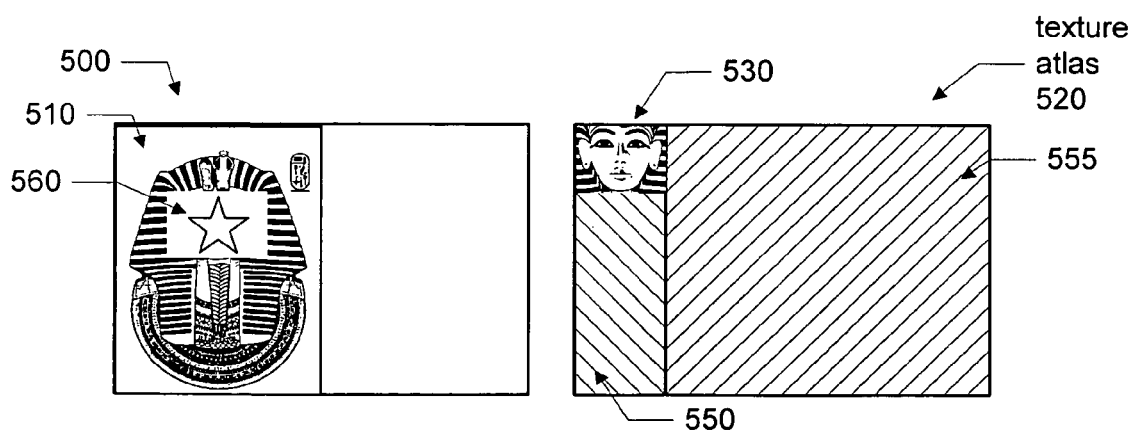
Figure 5D:
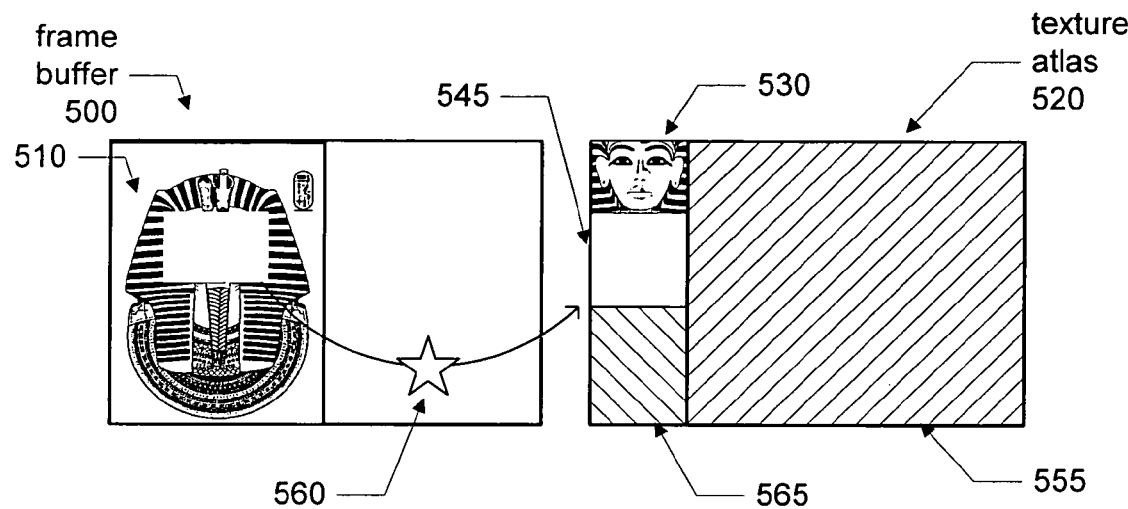
Figure 5E:
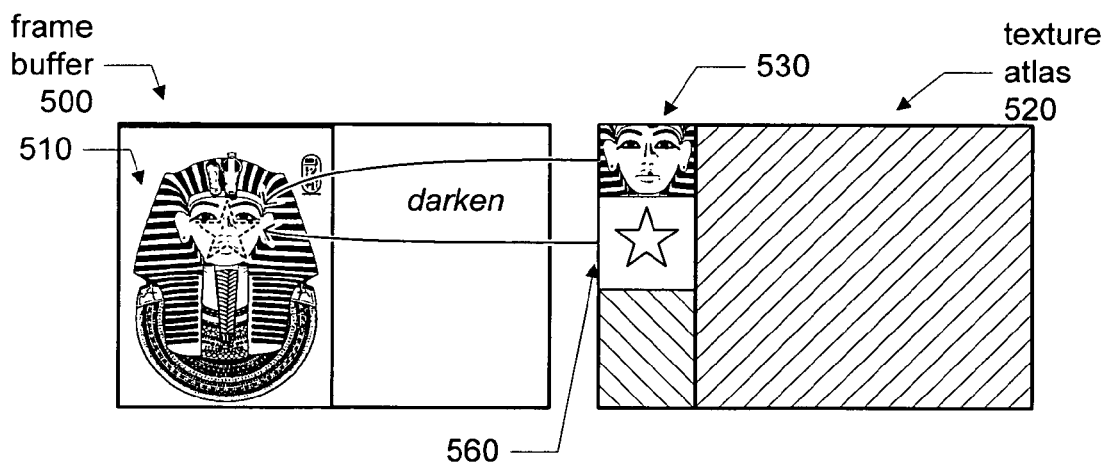
Figure 5F:
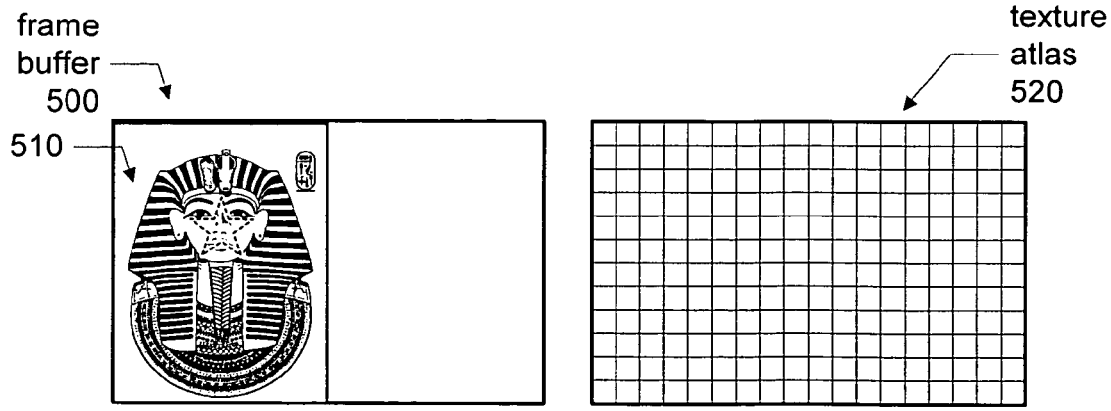

For instance, a scene may need to be drawn which a face is visible through a partially transparent star, as illustrated in FIG. 5F. Initially, as illustrated in FIG. 5A, an image 510 may be rendered to frame buffer 500. Subsequently, the star needs to be rendered. As noted above, rendering or rasterizing can only be performed to a frame buffer. As switching between different frame buffer is expensive in terms of execution time, using a single frame buffer may result in significant performance improvements over using multiple frame buffers. Thus, in some embodiments, frame buffer 500 may be used to render the star image 560. However, merely rendering the star directly onto frame buffer would necessarily overwrite or lose portions of the underlying image 510 already rendered to frame buffer 500. Thus, as illustrated in FIG. 5B, a portion of image 510, such as sub-image 530 may be copied into texture atlas 520. The size of sub-image 530 may, in some embodiments, be selected to correspond to the space needed to render image 560.

When storing images or sub-images to texture atlas 520, the location at which to store a particular image may be selected to as to minimize the amount of wasted space in the texture atlas. Thus, as illustrated in FIG. 5B, image 530 may be stored in the upper left corner of texture atlas 520, thereby maximizing the size of the remaining empty portions of texture atlas 520. By contrast, storing image 530 in the center of texture atlas 520 would limit the size of other images that might also be stored in the remaining empty portions of the texture atlas. In some embodiments, the remaining, empty portions of texture atlas 520 may be divided into separate empty blocks 550 and 555 in order to facilitate finding a suitable location in which to store a subsequent image or sub-image. In other embodiments, however, the remaining portions of texture atlas 520 may be divided horizontally rather than vertically as illustrated in FIG. 5B. In yet other embodiments, however, the remaining empty portion of texture atlas 520 may not be subdivided. In some embodiments, the remaining empty portion of texture atlas 520 may not be subdivided until another image is to be copied and a location for that image is determined within texture atlas 520.

After sub-image 530 is copied to texture atlas 520, the portion of image 510 from which sub-image 530 was copied may be cleared or emptied in preparation of rendering a new image. Please note that in some embodiments, the portion of image 510 from which sub-image 530 was copied may not be cleared or emptied in preparation of rendering a new image. In general, whether or not portions of the frame buffer are cleared or emptied may depend upon the manner in which a new image in rendered. For example, if a new image is rendered such that the pixels of the new image completely replace the existing pixels, the portion of the frame buffer to which the new image to be rendered may not be cleared. However, if the new image is to be rendered such that new pixels are combined or blended with the existing pixel, the portion of the frame buffer may be cleared prior to rendering the new image. Please note that while described herein as clearing portions of a frame buffer to which images may be rendered, transparency groups may be rendered without clearing or emptying portions of the frame buffer in some embodiments, depending upon the manner in which the images of the transparency groups may be rendered, as noted above.

Thus, suitable space may be available in frame buffer 500 to render image 560 without allocating and/or switching to another frame buffer. After image 560 is rendered in the space from which sub-image 530 was copied, as illustrated in FIG. 5C, the newly rendered image 560 may be copied into the texture atlas, as illustrated in FIG. 5D. In some embodiments, image 560 may be copied into texture atlas 520 at a location 545 within the smaller of the empty blocks remaining in texture atlas 520 after sub-image 530 was stored. For example, the currently empty portions of texture atlas 520 may be searched to determine the smallest empty portion that would hold an image to be stored. Thus, image 560 may be copied into empty block 550 of texture atlas 520 resulting in block 550 being split into location 545 into which image 560 is copied and empty block 565.

After, image 560 is copied into texture atlas 520, the portion of image 510 onto which image 560 was rendered may be cleared or erased, as illustrated in FIG. 5D. In some embodiments, sub-image 530 may not able to be copied directly back into image 510 after image 560 was rendered. Thus, as illustrated in FIG. 5E, sub-image 530 and image 560 may be merged or blended and copied into image 510. For instance image 560 may have a transparency of 50%, meaning that 50 percent of the image behind image 560 may be visible through image 560. Thus, when image 560 is combined with sub-image 530, the appropriate blending between the pixels of image 560 and sub-image 530 may be used to affect the transparency of image 560 over sub-image 530. Additionally, the combination of images 560 and 530 may then be copied into image 510 in the portion previously cleared after image 560 was copied to texture atlas 520, as illustrated in FIG. 5F.

Please note that while only two images (sub-image 530 and image 560) are illustrated being rendered and copied to texture atlas 520 in FIGS. 5A through 5F, in other embodiments, additional images may also be rendered and copied to texture atlas 520 as part of rendering a transparency group. For example, in one embodiments, image 560 may actually be a composite image of multiple sub-images, and in order to properly merge those sub-images, each individual sub-image may be rendered to the cleared space of image 510 and then stored in the texture atlas. Subsequently, the sub-images may be merged together and copied into image 560 within image 510. Then image 560 may itself be copied into texture atlas 520. Additionally, in some embodiments, more than two images or sub-images may be merged together and copied from texture atlas to the frame buffer. For example, in one embodiment, sub-image 530 and image 560 may be merged with a third sub-image and copied to frame buffer 500. For instance, an additional image may be merged with sub-image 530 and image 560 to "clip" the transparency values (e.g. the alpha values) when sub-image 530 and image 560 are merged and copied to the frame buffer. In general, any number of images and/or sub-images may be merged and copied from the texture atlas to the frame buffer, according to various embodiments.

Once both sub-image 530 and image 560 are combined and copied into image 510, those portions of texture atlas 510 used to store sub-image 530 and image 560 may be made available for storing subsequent images. Additionally, the individual portions of texture atlas 520 that were created when storing sub-image 530 and image 560 may be merged. For example, block 565 may be merged with block 545 to regenerate block 550, block 550 may be merged with block 540 and with block 555 to free the entire texture atlas for use. While described above as individual blocks being merged or collapsed in the reverse order in which they were used, in some embodiments, all of the empty portions of texture atlas 520 may be merged together at one time.

In some embodiments, transparency groups may be included within other transparency groups. Such transparency groups may be considered recursive transparency groups since the rendering of the overall or outer transparency group requires the rendering of each of the smaller or inner transparency groups. Thus, when rendering the outer transparency group, the portion of the image already rendered or rasterized to the frame buffer may be copied into the texture atlas and the inner transparency group may rendered to the frame buffer, also copied into the texture atlas and combined with the previous portion of the image and copied to the frame buffer.

Figure 6:
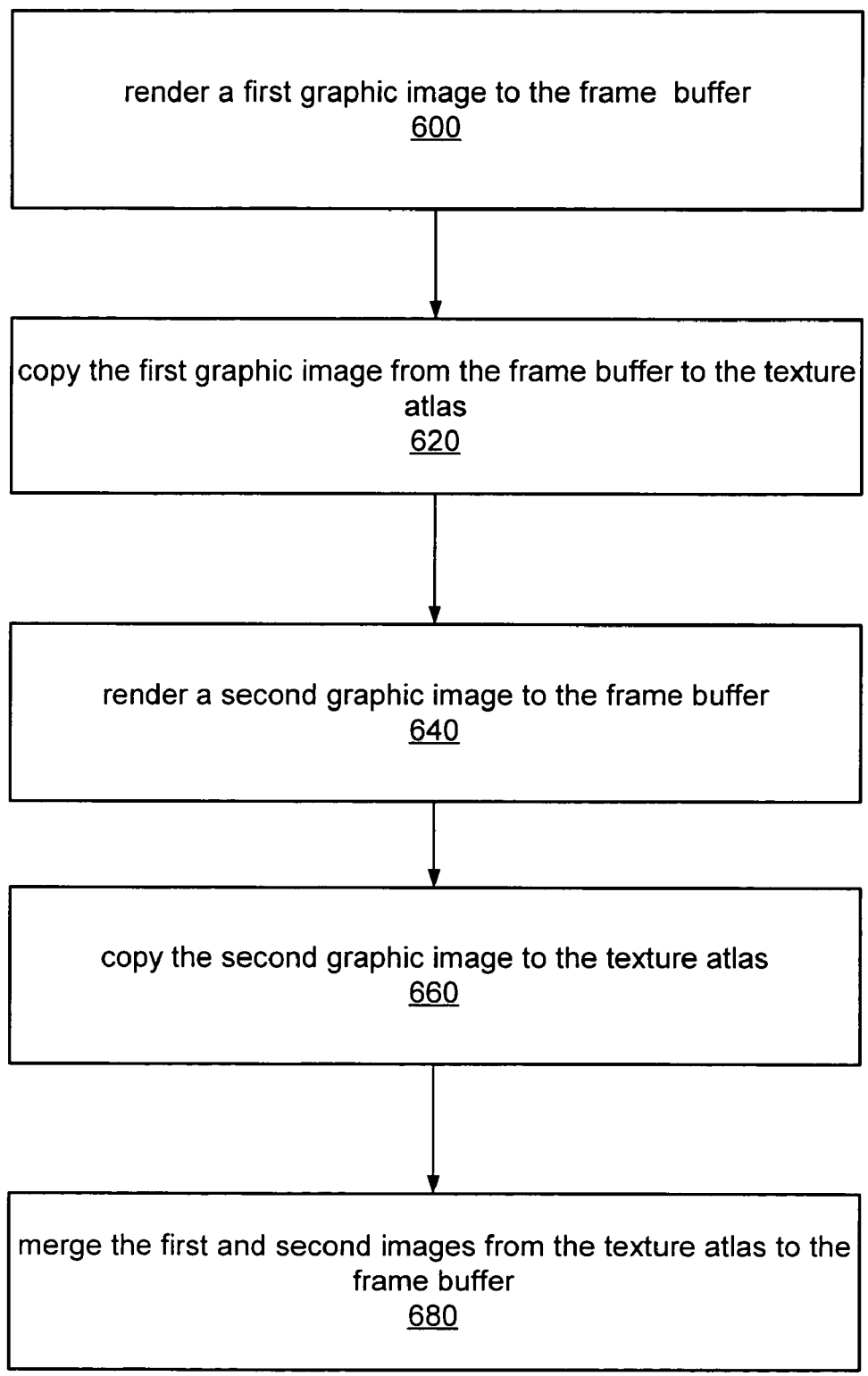
FIG. 6 is a flowchart illustrating one embodiment of a method for rendering a transparency group on a GPU using a single frame buffer as described herein.

FIG. 6 is flowchart illustrating one embodiment of a method for rendering a transparency group on a GPU using a single frame buffer. As described above, by using one or more texture atlases to temporarily store rendered images, complex scenes may be rendered using transparency groups on a GPU with only a single frame buffer, thereby obviating the need to perform potential expensive context switches between frame buffers. Thus, as described herein, a single frame buffer may be utilized to render or rasterize all image, even smaller images that will become part of a larger image and by temporarily storing images, such as sub images of a larger image in a texture atlas.

As indicated by block 600, a first graphic image is rendered to the frame buffer. For example, as described above, background image 510 may be rendered to frame buffer 500. Subsequently, when another image is to be added to or blended with image 510, a portion of image 510, such as image 530, may be copied from the frame buffer to the texture atlas, as indicated by block 520. For example, when rendering the image 560 of a star onto already rendered image 510, rather than allocate an additional frame buffer into which image 560 may be rendered or rasterized a portion of image 510, referred to as image 530, may be copied into texture atlas 520. As noted above, images may be copied into and out of a texture atlas, but may not be rendered or rasterized to the texture atlas. For instance, a texture atlas may not be the target of a graphic primitive to draw a line, such as one edge of a polygon. Instead, images or pixels may only be rasterized to a frame buffer.

Additionally, the portion of the image 510 copied to the texture atlas may represent the size needed to render the second image. After copying image 530 to the texture atlas, the portion of the image 510 occupied by the image 530 may be cleared or erased in order to ready it for rending a second image. The second image may then be rendered to the frame buffer in the cleared area, as indicated by block 640. Thus, as described above, image 560 may be rendered to the area cleared after copying image 530 to texture atlas 520. After rending the second image to the frame buffer, the second image may also be copied to the frame buffer, as indicated by block 660.

After image 560 has been rendered and stored in texture atlas 520, both image 560 and image 530 may be merged and copied back into image 510, as indicated by block 680. In some embodiments, various blending or merging effects may be used when copying the two images back into image 510. Additionally, in one embodiment the area of image 510 used to render image 560 may be cleared or erased before merging and copying images 530 and 560.

Thus, a texture atlas, normally used to store static textures, may dynamically store various images in order to use a single frame buffer to render various images while using the texture map to temporarily store images, subimages or partial images, during the rendering process.

Figure 7A:
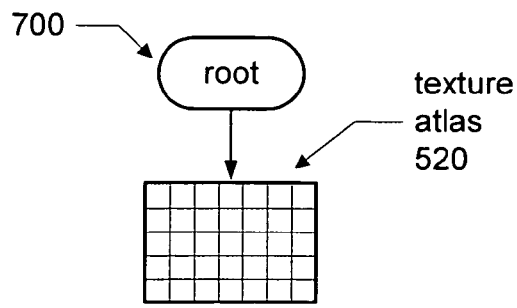
FIGS. 7A through 7G are block diagrams illustrating a tree structure to maintain information regarding images stored in a texture atlas.

Various methods may be used to maintain and keep track of the images in a texture atlas. Since, when processing transparency groups, various individual images may be temporarily stored to the texture atlas and subsequently copied to the frame buffer, the texture atlas may have very dynamic amounts of allocation and image usage. Additionally, the individual images may need to be individually identifiable and/or addressable in the texture atlas. While in some embodiments, it may be possible to utilize a first in last out scheme for allocating image spaces in the texture atlas, in other embodiments, images may be copied from the texture atlas in a different order than an order in which they were copied to the texture atlas. In some embodiments, a linked list or other dynamic memory structure may be used to maintain and locate images that are stored in the texture atlas. For example, as illustrated in FIGS. 7A-7G, a tree structure, such as a binary tree may be used to maintain, keep track of, and/or locate images within the texture atlas. For example, FIG. 7A illustrates the root node 700 of a structure representing an empty texture atlas 520 that has not had any images copied into it. As various methods of generating and maintaining linked lists and dynamically linked nodes are well known in the art, they will not be discussed in detail herein.

Figure 7B:
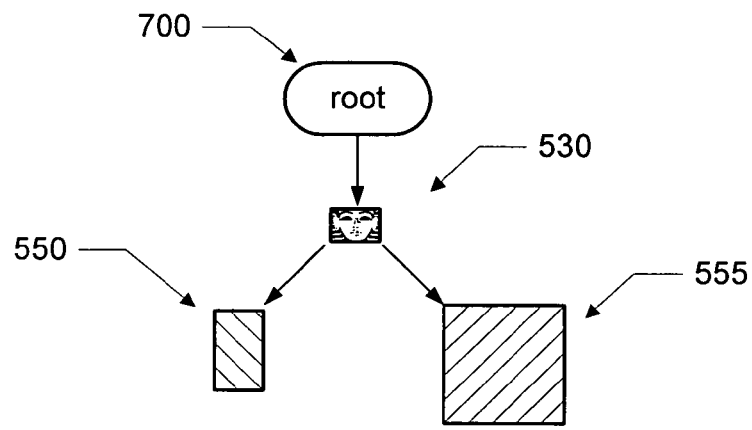
Figure 7C:
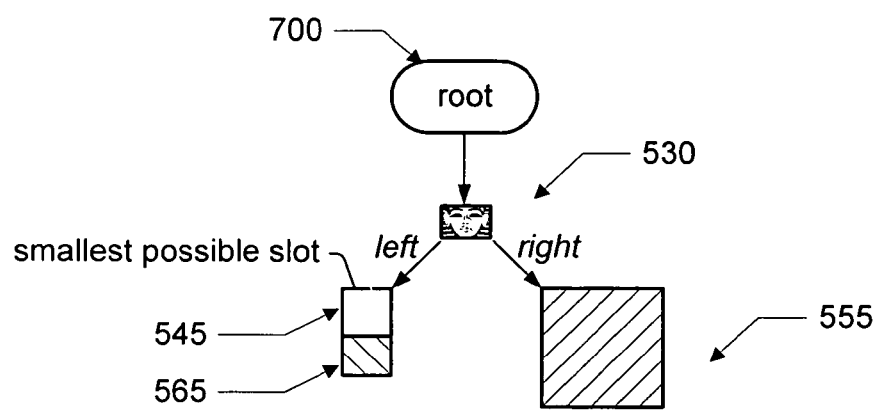

When an image, such as image 530, is to be copied into texture atlas 520, a suitable section of the texture atlas must be allocated or assigned to the image. As described above, various methods and algorithms may be used to select a suitable location within the texture atlas to store the image. In some embodiments, a method that reasonably maximizes the packing of images and/or minimized the amount of wasted space with the texture atlas may be used. After copying the image to the texture atlas, the tree structure may be updated to keep track of the image and the free areas of the texture atlas. Thus, as illustrated in FIG. 7B, a new node referencing image 530 may be allocated and added to the tree structure such that root node 700 may include a link to the new node. Please note that while FIG. 7B shows image 530 as the node the in tree structure, in many embodiments, a node of the tree structure may not be, or include, the actual image, but instead may include information identifying the image and indicating the location within texture atlas 520 where the image is stored. For instance, each node of the tree structure may be configured to hold information identifying the image stored and coordinates indicating where in the texture atlas the image is stored. Additionally, the node may store the size of the image, according to some embodiments.

Thus, FIG. 7A through 7G illustrate the logical arrangement of the texture atlas and a tree structure used to maintain information related to the allocation of the texture atlas. Thus, FIG. 7B also illustrates two additional nodes in the tree structures each including information regarding the to empty sections of the texture atlas, sections 550 and 550, discussed above.

As illustrated in FIG. 7B, the tree structure may include two links off of each non-terminal node, according to one embodiment. Thus, the node referring to image 530 may include two links to the two empty blocks of texture atlas 520. The leaf or terminal nodes of the tree structure may always indicate either an empty block of the texture atlas or null, as will be discussed below. In some embodiments, the leaf nodes of the tree structure may be sorted by the size of the empty texture atlas blocks. For example, FIG. 7B illustrates two empty blocks of texture atlas 520 after image 530 is stored. One link may be designated a left link and may reference a node indicating the smaller of the two empty texture atlas blocks, such as block 550, and another link may be designated a right link may reference a node indicating the larger of the two empty texture atlas blocks, such as block 555.

When another image, such as image 560, is to be copied into texture atlas 520, in some embodiments the smallest slot available that will hold the image to the copied may be located, according to one embodiment. As illustrated by block 7C, if image 560 fits into the smaller of the two empty texture atlas blocks, block 550, that block may be split into two blocks, blocks 545 and 565, one to hold image 560 in the texture map and one to hold the remaining empty area from block 550 after image 560 is stored. If (not illustrated) image 560 does not fit into block 550, the larger block 555 might be split into multiple blocks in order to store the image, according to another embodiments. In yet another embodiment, if image 560 does not fit into any of the empty texture atlas blocks a new texture atlas may be allocated and used to store the image. If multiple texture atlases are allocated and used, the nodes of the tree structure may include information indicating in which texture atlas a particular image is stored.

Figure 7D:
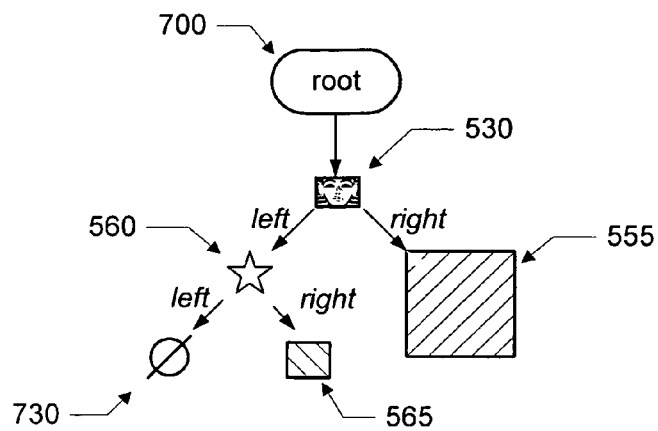

After image 560 is stored in the texture atlas a new node referencing the stored image may be added to the tree structure, as illustrated in FIG. 7D, according to one embodiment.

Figure 7E:
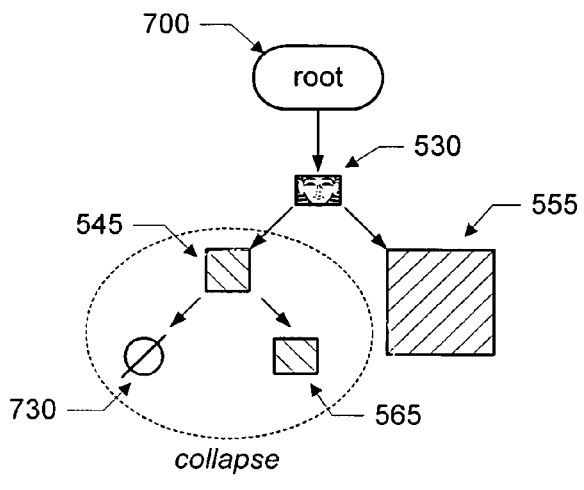

The tree structure may now include two nodes referencing stored images (images 530 and 560), two nodes referencing empty texture atlas blocks (blocks 555 and 565) and one null node 730. If, in one embodiment, another image was to be stored in texture atlas 520, the tree structure may be traversed searching for a suitable empty block in which to store the image. In some embodiments, the individual links of the tree structure may be traversed in a left-first fashion in order look at smaller empty blocks before larger empty blocks in an attempt to locate the smallest empty block that will hold an image. Thus, in the embodiment illustrated in FIG. 7D, the tree structure may be traversed to the left until the null node 730 is encountered and then the right link of code 560 may be traverse to determine whether block 565 would hold the image. Please note that while FIGS. 7D and 7E illustrate store null nodes, such as node 730 in a left link, other embodiments may store null nodes in the right link. In other embodiments, the nodes of a structure maintaining information regarding empty blocks of the texture atlas may be traversed in other orders or manners when locating a location at which to store an image in the texture atlas. For example, in one embodiment, the tree structure may be traversed in a right first manner in order to search the larger empty blocks before the smaller empty blocks. In another embodiment, a separate set of links may be used to traverse only nodes referencing empty blocks, while avoiding nodes referencing stored images. In yet other embodiments, two linked lists, one maintain information regarding stored image and the other maintaining information regarding empty nodes, may be used and thus the linked list maintain information regarding the empty nodes may be traversed when storing an image into the texture atlas.

In general, any suitable method or mechanism to keep track of where in the texture map particular image, image portions, or image elements, are stored may be used. In one embodiment, the locations at which images are stored within the texture atlas may be maintained in a tree structure. For example, at each node the tree structure may include an image copied to the texture atlas. Links off of each node of the tree structure may hold the remaining portions of the texture atlas. When a new image is copied to the texture atlas, a new node may be added to the tree.

Figure 7F:
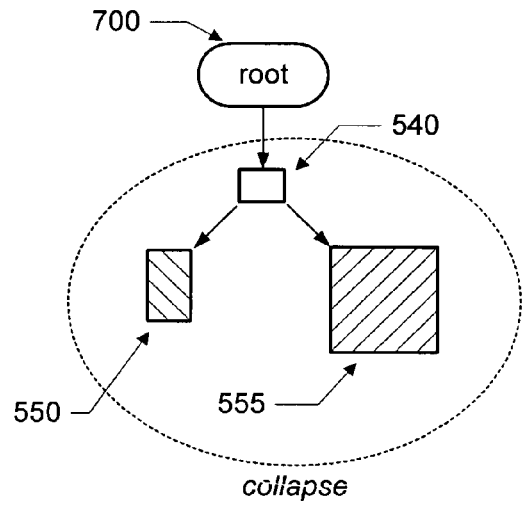
Figure 7G:
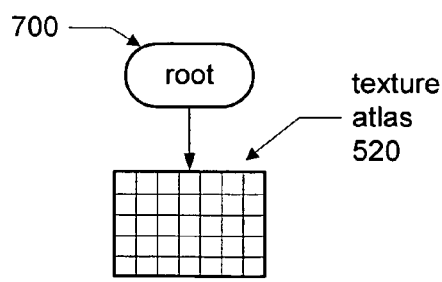

In some embodiments, the tree structure may aid the ability to combine empty portions of the texture atlas when images are removed from the texture atlas because neighboring portions of the texture atlas may reside at neighboring nodes in the tree structure. For example, as illustrated in FIGS. 7E and 7F, when image 560 is copied out of the texture atlas and it is no longer necessary to store image 560 in the texture atlas, the two adjacent empty blocks 545 and 565 may be merged back into the single empty block 550. Similarly, when it is no longer necessary to store image 530 in the texture atlas, the two adjacent empty blocks 550 and 555 may be merged—resulting in the entire empty texture atlas 520, as illustrated in FIGS. 7F and 7G.

In other embodiments, however, different methods and/or mechanisms may be utilized to keep track of the allocated and empty portions of the texture atlas. For example, the images stored in the texture atlas may be indexed using a linked list. Additionally, the empty portions of the texture atlas may also be maintained via a linked list. Thus, when an image is copied into the texture atlas, the rectangle of the texture atlas bounding the copied image may added to the allocated linked list and the remaining rectangles left over from removing the allocated rectangle may be included in the empty linked list.

While improvements in terms of efficiently and/or optimally using the available space of a texture atlas may be obtained by using longer or exhaustive searches to find a better fit or the best location at which to store an image within the texture atlas, such improvements must be weighed against the increase in time required to find optimal or best fit when storing an image into the texture atlas. For example, when a graphics application is rendering a complex scene including a large number of transparency groups and or graphics objects, the overall time spent drawing the scene may be increased dramatically by exhaustively searching to find the best fit when storing images to the texture atlas. Thus, in some embodiments, a constant time algorithm may be used when determining where to store an image in the texture atlas. For example, the tree structure illustrated in FIGS. 6A-6G may be searched only for a fixed amount of time and the most location (best fit) found during that time may be used to store the image. For example, the tree structure may be searched in left first manner checking the empty texture atlas blocks in order from smallest to largest for a predetermined amount of time, but if an appropriate location is not found within that time, the search may then start checking the larger empty texture atlas blocks, such as by using the rightward link off of the first node in the tree structure. In other embodiments, however, a variable time search algorithm may be used in order to increase the space efficiency of the texture atlas.

Rendering transparency groups on a GPU using a single frame buffer, as described herein may be implemented on various types of computer systems. Referring again to FIG. 1, computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device.

The transparency group renderer 120 described herein may be provided as a computer program product, or software, that may include a computer-readable storage medium having stored thereon instructions, which may be used to program a computer system (or other electronic devices) to implement a transparency group renderer as described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1000 may include a processor unit (CPU) 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. Embodiments of the transparency group renderer described herein may include fewer or additional components not illustrated in FIG. 1 (e.g., video cards, audio cards, storage devices, additional network interfaces, peripheral devices, or other components). The CPU 1030, the network interface 1050, and the memory 1010 may be coupled to the interconnect 1040. It should also be noted that one or more components of system 1000 might be located remotely and accessed via a network. One or more of the memories 1010 may embody a transparency group renderer 120.

In some embodiments, memory 1010 may include program instructions configured to implement a transparency group render 120, as described herein. Transparency group render 120 may be implemented in any of various programming languages or methods. For example, in one embodiment, transparency group render 120 may be JAVA based, while in another embodiments, it may be implemented using the C or C++ programming languages. In other embodiments, transparency group renderer 120 may be implemented using specific graphic languages specifically for developing programs executed by specialize graphics hardware, such as GPU 1040. In addition, transparency group renderer 120 may be embodied on memory specifically allocated for use by graphics processor(s) 1040, such as memory on a graphics board including graphics processor(s) 1040. Thus, memory 1010 may represent dedicated graphics memory as well as general purpose system RAM. Alternately, memory 1010 may represent video memory that includes a frame buffer 130.

Network interface 1040 may be configured to enable computer system 1000 to communicate with other computers, systems or machines, such as across network 100, described above. Network 100 may enable data communication between computer system 1000 and among other entities illustrates in FIGS. 1A and 1B, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

While the transparency group render has been described with reference to various embodiments, it will be understood that these embodiments are illustrative and that the scope of the document-based data collection system is not limited to them. Many variations, modifications, additions, and improvements are possible. More generally, the present transparency group render is described in the context of particular embodiments. For example, the blocks and logic units identified in the description are for ease of understanding and not meant to limit the transparency group render to any particular embodiment. Functionality may be separated or combined in blocks differently in various realizations or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
   one or more graphic processors; and
   memory coupled to the one or more graphic processors, comprising:
     a frame buffer; and
     texture buffer configured as a texture atlas;
   wherein the memory is configured to store program instructions executable by the one or more graphic processors to:
     render a first graphic image to the frame buffer;
     copy a portion of the first graphic image from the frame buffer to the texture atlas;
     render a second graphic image to the frame buffer;
     copy the second graphic image to the texture atlas, wherein the portion of the first graphic image and the second graphic image are independently addressable in the texture atlas; and
     merge the portion of the first graphic image and second graphic image from the texture atlas onto the frame buffer;
   wherein said rendering the first graphic image, said copying the portion of the first graphic image, said rendering the second graphic image, said copying the first graphic image and said merging are performed using the same frame buffer and without performing a context switch between the frame buffer and any other frame buffer.

2. The system of claim 1, wherein to merge the portion of the first graphic image and the second graphic image the program instructions are further executable to blend the portion of the first graphic image and the second graphic image according to a transparency level associated with the second graphic image.

3. The system of claim 1, wherein to render the second graphic image the program instructions are further executable to:
   render a third graphic image to the frame buffer;
   copy the third graphic image to an independently addressable location in the texture atlas;
   render a fourth graphic image to the frame buffer;
   copy the fourth graphic image to an independently addressable location in the texture atlas; and merge the third and fourth graphic images from the texture atlas to the frame buffer as the second graphic image.

4. The system of claim 1, wherein the program instructions are further executable to clear an area of the frame buffer from which the portion of the first graphic image was copied.

5. The system of claim 1, wherein the program instructions are further executable to clear an area of the frame buffer from which the second graphic image was copied.

6. The system of claim 1, wherein the first and second graphic images are comprised in a transparency group, wherein the transparency group comprises a plurality of individual graphics images, wherein each individual graphic image is associated with a transparency level and wherein the transparency group is associated with a transparency level distinct from the respective transparency level of any of the plurality of graphic images.

7. The system of claim 1, wherein the program instructions are further executable to maintain information indicating regions of the texture atlas to which the portion of the first graphic image and the second graphic images are copied.

8. The system of claim 7, wherein the program instructions are further executable to update the maintained information to indicate that the regions to which the portion of the first image and the second image were copied are available for copying other images after said merging the portion of the first image and second image.

9. The system of claim 7, wherein the program instructions are further executable to maintain the information in a tree structure.

10. The system of claim 9, wherein the program instructions are further executable to:
    divide the remaining empty portions of the texture atlas into multiple rectangular empty regions after said copying the portion of the first graphic image from the frame buffer to the texture atlas, wherein the maintained information further indicates the multiple rectangular empty regions; and
    traverse the tree structure to determine a location to which to copy the second graphic image from among the multiple rectangular empty regions.

11. A method, comprising:
    rendering a first graphic image to a frame buffer;
    copying a portion of the first graphic image from the frame buffer to an independently addressable location of a texture atlas;
    rendering a second graphic image to the frame buffer;
    copying the second graphic image to an independently addressable location of a texture atlas; and
    merging the portion of the first graphic image and the second graphic image from the texture atlas onto the frame buffer;
    wherein said rendering the first graphic image, said copying a portion of the first graphic image, said rendering the second graphic image, said copying the second graphic image, and said merging are performed on a graphics processor using exactly one frame buffer and without performing a context switch between the frame buffer and any other frame buffer.

12. The method of claim 11, further comprising blending the portion of the first graphic image and the second graphic image according to a transparency level associated with the second graphic image.

13. The method of claim 11, wherein said rendering the second graphic image further comprises:
    rendering a third graphic image to the frame buffer;
    copying the third graphic image to an independently addressable location in the texture atlas;
    rendering a fourth graphic image to the frame buffer;
    copying the fourth graphic image to an independently addressable location in the texture atlas; and
    merging the third and fourth graphic images from the texture atlas to the frame buffer as the second graphic image.

14. The method of claim 11, further comprising clearing an area of the frame buffer from which the portion of the first graphic image was copied.

15. The method of claim 11, further comprising clearing an area of the frame buffer from which the second graphic image was copied.

16. The method of claim 11, wherein the first and second graphic images are comprised in a transparency group, wherein the transparency group comprises a plurality of individual graphics images, wherein each individual graphic image is associated with a transparency level and wherein the transparency group is associated with a transparency level distinct from the respective transparency level of any of the plurality of graphic images.

17. The method of claim 11, further comprising maintaining information indicating regions of the texture atlas to which the portion of the first graphic image and the second graphic images are copied.

18. The method of claim 17, further comprising updating the maintained information to indicate that the regions to which the portion of the first image and the second image were copied are available for copying other images after said merging the portion of the first image and second image.

19. The method of claim 17, further comprising maintaining the information in a tree structure.

20. The method of claim 19, further comprising:
    dividing the remaining empty portions of the texture atlas into multiple rectangular empty regions after said copying the portion of the first graphic image from the frame buffer to the texture atlas, wherein the maintained information further indicates the multiple rectangular empty regions; and
    traversing the tree structure to determine a location to which to copy the second graphic image from among the multiple rectangular empty regions.

21. A non-transitory computer-readable medium, comprising program instructions executable by a graphic processor to implement:
    rendering a first graphic image to a frame buffer;
    copying a portion of the first graphic image from the frame buffer to an independently addressable location of a texture atlas;
    rendering a second graphic image to the frame buffer;
    copying the second graphic image to an independently addressable location of a texture atlas; and
    merging the portion of the first graphic image and the second graphic image from the texture atlas onto the frame buffer;
    wherein said rendering the first graphic image, said copying a portion of the first graphic image, said rendering the second graphic image, said copying the second graphic image, and said merging are performed on a graphics processor using exactly one frame buffer and without performing a context switch between the frame buffer and any other frame buffer.

* * * * *

UNITED STATES PATENT AND TRADEMARK OFFICE
CERTIFICATE OF CORRECTION

| | |
|---|---|
| PATENT NO. | : 7,889,205 B1 |
| APPLICATION NO. | : 11/586117 |
| DATED | : February 15, 2011 |
| INVENTOR(S) | : Alexandre S. Parenteau et al. |

It is certified that error appears in the above-identified patent and that said Letters Patent is hereby corrected as shown below:

Claim 21, col. 18, line 44, between "computer-readable" and "medium" please insert --storage--.

Signed and Sealed this
Tenth Day of May, 2011

David J. Kappos
*Director of the United States Patent and Trademark Office*